US008533630B2

(12) United States Patent
Sorenson

(10) Patent No.: US 8,533,630 B2
(45) Date of Patent: Sep. 10, 2013

(54) METHOD AND APPARATUS FOR CONTROLLING AN ARRAY OF INPUT/OUTPUT DEVICES

(75) Inventor: Paul F. Sorenson, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 2043 days.

(21) Appl. No.: 11/517,149

(22) Filed: Sep. 5, 2006

(65) Prior Publication Data

US 2008/0055238 A1 Mar. 6, 2008

(51) Int. Cl.
*G06F 3/048* (2013.01)

(52) U.S. Cl.
USPC ........................................ 715/840; 715/810

(58) Field of Classification Search
USPC ................................................ 715/840, 810
See application file for complete search history.

(56) References Cited

U.S. PATENT DOCUMENTS 5,889,843 A * 3/1999 Singer et al. ............ 379/202.01
2002/0075815 A1* 6/2002 Sharma et al. ............... 370/276
2002/0154783 A1* 10/2002 Fincham ........................ 381/17
2004/0240686 A1* 12/2004 Gibson ........................ 381/119
2005/0232602 A1* 10/2005 Kreifeldt et al. ............... 386/96
2008/0253592 A1* 10/2008 Sanders et al. ............... 381/306

OTHER PUBLICATIONS

Help, Microsoft Word 2003, Margins and Page Setup.
Help, Windows Media Player 9 Series, Adjusting the volume.

* cited by examiner

*Primary Examiner* — William Bashore
*Assistant Examiner* — Gregory A Distefano
(74) *Attorney, Agent, or Firm* — Blakely, Sokoloff, Taylor & Zafman LLP

(57) ABSTRACT

A processing system may include an array of input/output (I/O) devices (e.g., an array of microphones, an array of antennas, etc.) A device array control program for the processing system may provide a user interface for controlling the array of I/O devices. The user interface may include an array of objects representing the array of I/O devices, as well as a set of controls near the array of objects. The controls may include a right handle, a left handle, and a gain handle. The left handle and the right handle may be moved by a user to control which I/O devices will be used, and the gain handle may be moved to control gain for at least one of the I/O devices. Other embodiments are described and claimed.

19 Claims, 5 Drawing Sheets

METHOD AND APPARATUS FOR CONTROLLING AN ARRAY OF INPUT/OUTPUT DEVICES

FIELD OF THE INVENTION

The present disclosure relates generally to the field of data processing, and more particularly to methods and related apparatus for controlling an array of input/output (I/O) devices (e.g., microphones, antennas, etc).

BACKGROUND

A data processing system typically includes various hardware resources (e.g., memory and one or more processing units) and software resources (e.g., an operating system (OS) and one or more user applications). The hardware resources may include devices such as microphones, antennas, and other I/O devices.

For instance, a laptop computer may include an array of microphones located at different locations on the chassis, and an array of antennas located at different locations within the chassis. The software may include a program for controlling a selected microphone or antenna. However, it may be difficult, inconvenient, or impossible to control multiple microphones or antennas using conventional software.

BRIEF DESCRIPTION OF THE DRAWINGS

Features and advantages of the present invention will become apparent from the appended claims, the following detailed description of one or more example embodiments, and the corresponding figures, in which:

DETAILED DESCRIPTION

Figure 1:
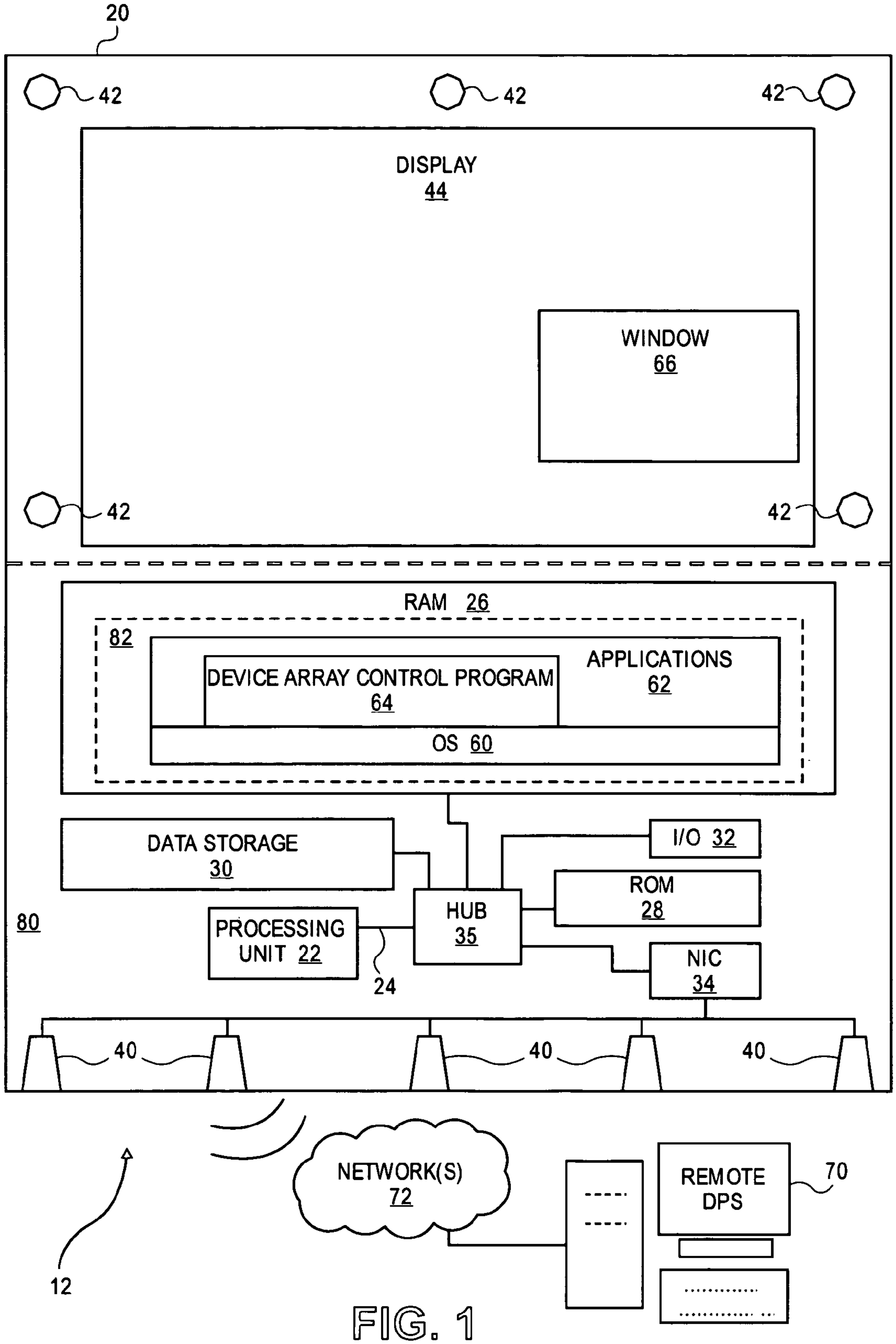
FIG. 1 is a block diagram depicting a suitable data processing environment in which certain aspects of an example embodiment of the present invention may be implemented.

FIG. 1 is a block diagram depicting a suitable data processing environment 12 in which certain aspects of an example embodiment of the present invention may be implemented. Data processing environment 12 includes a processing system 20 that includes various hardware components 80 and software components 82. The hardware components may include, for example, one or more processors or CPUs 22, communicatively coupled, directly or indirectly, to various other components via one or more system buses 24 or other communication pathways or mediums. Processor 22 may includes one or more processing units. Alternatively, a processing system may include multiple processors, each having at least one processing unit. The processing units may be implemented as processing cores, as Hyper-Threading (HT) technology, or as any other suitable technology for executing multiple threads simultaneously or substantially simultaneously.

As used herein, the terms "processing system" and "data processing system" are intended to broadly encompass a single machine, or a system of communicatively coupled machines or devices operating together. Example processing systems include, without limitation, distributed computing systems, supercomputers, high-performance computing systems, computing clusters, mainframe computers, mini-computers, client-server systems, personal computers (PCs), workstations, servers, portable computers, laptop computers, tablet computers, personal digital assistants (PDAs), telephones, handheld devices, entertainment devices-such as audio and/or video devices, and other devices for processing or transmitting information.

Processing system 20 may be controlled, at least in part, by input from conventional input devices, such as a keyboard, a pointing device such as a mouse, etc. Input devices may communicate with processing system 20 via an I/O port 32, for example. Processing system 20 may also respond to directives or other types of information received from other processing systems or other input sources or signals. Processing system 20 may utilize one or more connections to one or more remote data processing systems 70, for example through a network interface controller (NIC) 34, a modem, or other communication ports or couplings. Processing systems may be interconnected by way of a physical and/or logical network 72, such as a local area network (LAN), a wide area network (WAN), an intranet, the Internet, etc. Communications involving network 72 may utilize various wired and/or wireless short range or long range carriers and protocols, including radio frequency (RF), satellite, microwave, Institute of Electrical and Electronics Engineers (IEEE) 802.11, 802.16, 802.20, Bluetooth, optical, infrared, cable, laser, etc. Protocols for 802.11 may also be referred to as wireless fidelity (WiFi) protocols. Protocols for 802.16 may also be referred to as WiMAX or wireless metropolitan area network protocols, and information concerning those protocols is currently available at grouper.ieee.org/groups/802/16/published.html.

Within processing system 20, processor 22 may be communicatively coupled to one or more volatile or non-volatile data storage devices, such as random access memory (RAM) 26, read-only memory (ROM) 28, and one or more mass storage devices 30. The mass storage devices 30 may include, for instance, integrated drive electronics (IDE), small computer system interface (SCSI), and serial advanced technology architecture (SATA) hard drives. The data storage devices may also include other devices or media, such as floppy disks, optical storage, tapes, flash memory, memory sticks, compact flash (CF) cards, digital video disks (DVDs), etc. For purposes of this disclosure, the term "ROM" may be used in general to refer to non-volatile memory devices such as erasable programmable ROM (EPROM), electrically erasable programmable ROM (EEPROM), flash ROM, flash memory, etc.

Processor 22 may also be communicatively coupled to additional components, such as one or more video controllers, SCSI controllers, network controllers, universal serial bus (USB) controllers, I/O ports, input devices such as a camera, etc. Processing system 20 may also include one or more bridges or hubs 35, such as a memory controller hub (MCH), an I/O controller hub (ICH), a peripheral component interconnect (PCI) root bridge, etc., for communicatively coupling system components. As used herein, the term "bus" includes pathways that may be shared by more than two devices, as well as point-to-point pathways.

Some components, such as NIC 34, for example, may be implemented as adapter cards with interfaces (e.g., a PCI connector) for communicating with a bus. Alternatively, NIC 34 and other devices may be implemented as on-board or embedded controllers, using components such as programmable or non-programmable logic devices or arrays, application-specific integrated circuits (ASICs), embedded processors, smart cards, etc.

In the example embodiment, processing system 20 includes an array of five antennas 40 located at various points within the chassis to transmit and receive electromagnetic signals, to support wireless network communications for instance. In addition, processing system includes an array of five microphones 42 located various points in the chassis to receive audio input. For instance, as illustrated in FIG. 1, processing system 20 may include a display 44, and microphones 42 may be dispersed around the perimeter of display 44. In alternative embodiments, a processing system may include arrays of other types of I/O devices, and each array may include fewer than five or more than five I/O devices.

The invention may be described herein with reference to data such as instructions, functions, procedures, data structures, application programs, configuration settings, etc. When the data is accessed by a machine, the machine may respond by performing tasks, defining abstract data types or low-level hardware contexts, displaying objects in a display or screen, and/or performing other operations, as described in greater detail below. The data may be stored in volatile and/or non-volatile data storage. For purposes of this disclosure, the term "program" covers a broad range of software components and constructs, including applications, drivers, processes, routines, methods, modules, and subprograms. The term "program" can be used to refer to a complete compilation unit (i.e., a set of instructions that can be compiled independently), a collection of compilation units, or a portion of a compilation unit. Thus, the term "program" may be used to refer to any collection of instructions which, when executed by a processing system, perform a desired operation or operations. For instance, ROM 28, data storage device 30, and/or RAM 26 may include various sets of instructions which, when executed, perform various operations. Such sets of instructions may be referred to in general as software.

In particular, in the example embodiment, software components 82 include an OS 60 and various user applications 62, including a device array control program (DACP) 64. DACP 64 provides a graphical user interface (GUI) that presents information regarding an array of I/O devices, and that also provides mechanisms or objects that a user can manipulate to configure or reconfigure the array of I/O devices. As illustrated in FIG. 1, DACP 64 may be implemented as an application to execute on top of OS 60. In alternative embodiments, the DACP may be implemented, in whole or part, at a lower level (e.g., as part of the OS or as part of the firmware). DACP 64 may display the GUI in a window 66 in display 44.

FIGS. 2-6 are schematic diagrams illustrating various arrangements of objects in a user interface for controlling an array of I/O devices, according to an example embodiment of the present invention. The user interfaces in FIGS. 2-6 represent GUIs created by DACP 64 to provide information about, and to enable a user to control, an array of I/O devices, such as the array of microphones 42 or the array of antennas 40.

Figure 7:
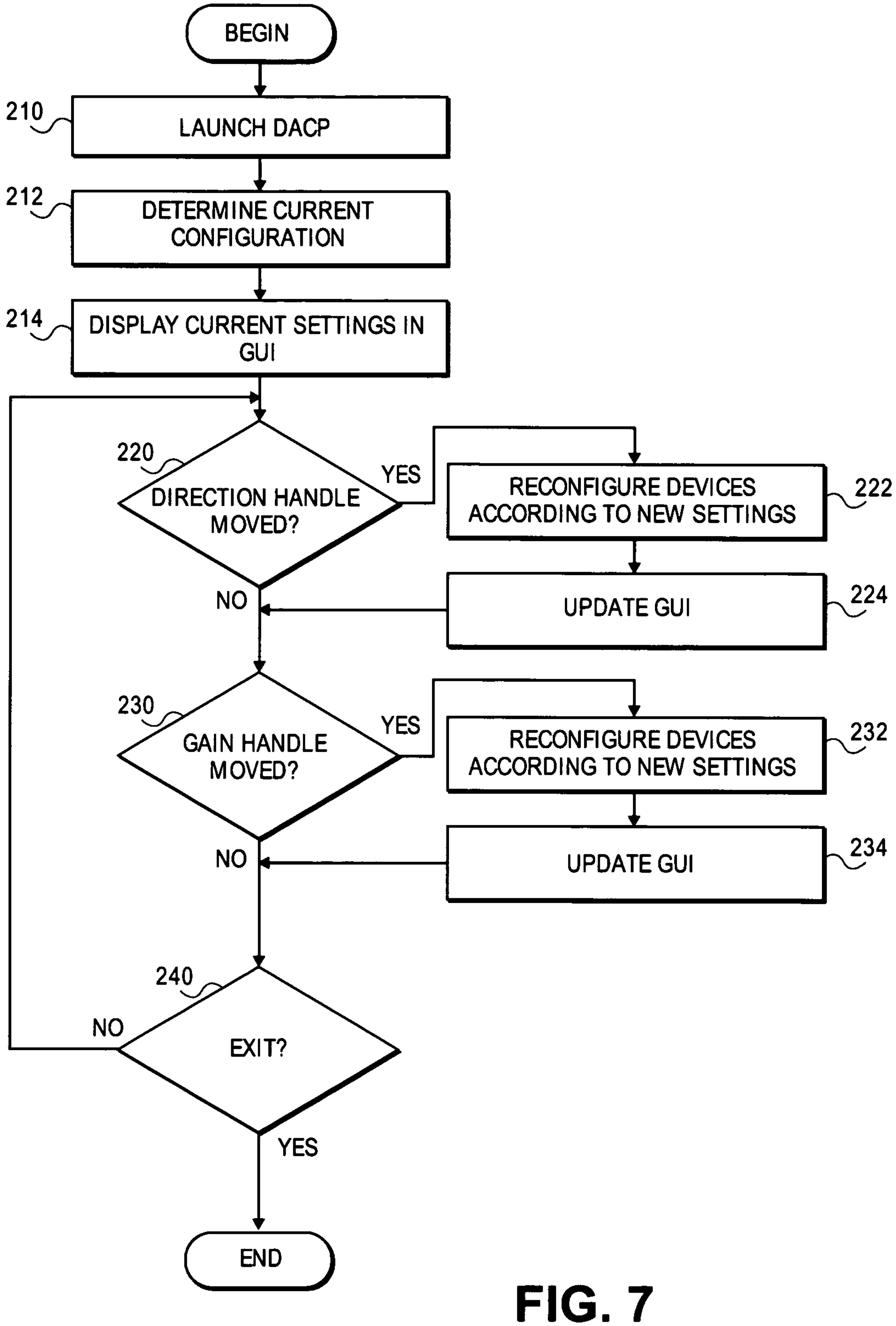
FIG. 7 is flowchart depicting a process for controlling an array of I/O devices, according to an example embodiment of the present invention.

FIG. 7 is flowchart depicting a process for controlling an array of I/O devices, according to an example embodiment of the present invention. The process of FIG. 7 may begin in response to a user opening DACP 64, for instance by double clicking on an object or icon associated with DACP 64. For instance, display 44 may include a task bar with an icon for controlling the array of microphones 42, and the process of FIG. 7 may start in response to the user clicking on that icon. First, processing system 20 may launch DACP 64, as indicated at block 210. As shown at block 212, DACP 64 may then automatically determine the current configuration of microphones 42. As depicted at block 214, DACP 64 may then create window 66 in display 44, and may present within window 66 various graphical objects or items to reflect the current configuration of microphones 42.

Figure 2:
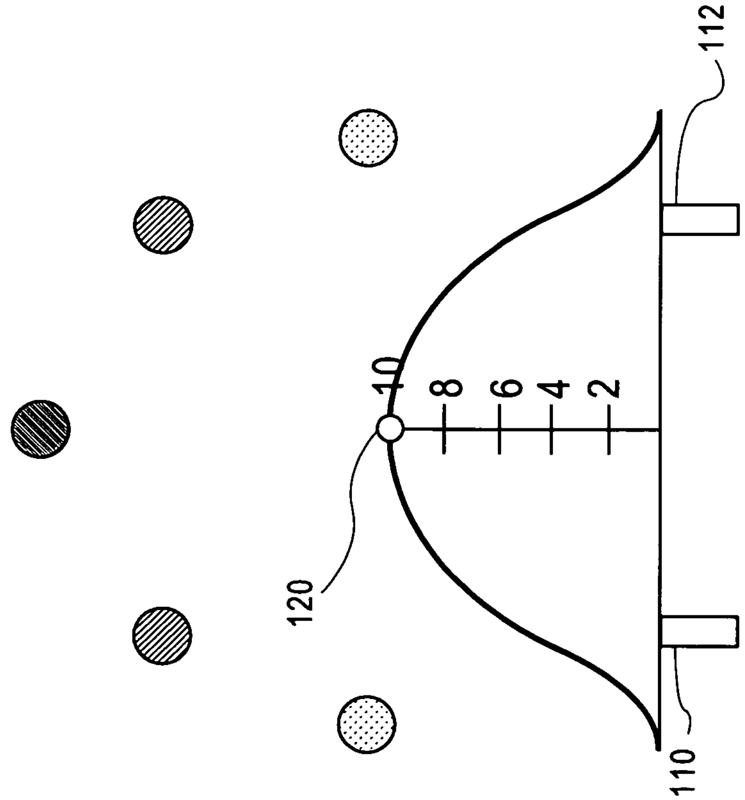

For instance, if the current configuration of microphones 42 has (a) the central microphone set at full gain, (b) the two intermediate microphones on either side of the central microphone set at half gain, and (c) the two microphones furthest from the central microphone disabled or set at minimum gain, DACP 64 may present a GUI such as the one depicted in FIG. 2.

The GUI of FIG. 2 includes numerous features or objects for portraying the current configuration of an array of devices, and for allowing a user to modify that configuration. For instance, at the top of the GUI is an array of gain indicator items, with one gain indicator item shown for each I/O device in the array of interest. Also, the appearance of each gain indicator item depicts the gain setting for the corresponding I/O device. For instance, in FIG. 2, the dense crosshatching in the third gain indicator item (from the left) indicates that the central microphone is set to full gain; the sparse crosshatching in the second and fourth gain indicator items indicates that the intermediate microphones are set to an intermediate gain level, and the dots in the first and fifth gain indicator items indicate that the two outermost microphones are disabled or set to minimum gain. Of course, in alternative embodiments, DACPs may give the gain indicator items other attributes to reflect the gain setting for each device. For instance, gain indicator items can be filled with a light blue color for disabled devices and a light green color for devices set to an intermediate gain level, with darker or more intense green colors for devices set to higher gain levels. Another approach would be to vary contrast or grey-level of the indicators in correlation with the gain settings. Many other approaches may be used in other embodiments to provide an array of gain indicator items that can reflect a spectrum of gain settings. In some or all of those embodiments, the visual representations or visual coding may clearly represent or signify a continuum of gain-settings or levels, from low to high, or from the minimum possible setting to the maximum possible setting for the elements involved.

In addition, below the gain indicator items, the GUI of FIG. 2 includes a gain scale numbered in even numbers from 2 to 10, and a gain indicator line that also reflects the gain settings of the I/O devices in the array. For instance, the level of the gain indicator line immediately below the third gain indicator item shows that the gain of the central microphone is set to the maximum gain of 10. Similarly, the level of the gain indicator line immediately below the second gain indicator item shows that the gain of the second microphone is set to a gain level of about 5. As with color or contrast-coding, the particular scale used is not as important as the fact that the scale represents the continuum of values or relative levels of gain that are possible with the elements in use.

The GUI of FIG. 2 also includes a left direction handle 110, a right direction handle 112, and a gain handle 120. DACP 64 allows a user to modify the configuration of the I/O device array by manipulating those handles. For instance, a user may use a pointing device to drag the direction handles to either side and to drag the gain handle up and down, to change the gain setting of the I/O devices.

Accordingly, referring again the FIG. 7, after displaying the current settings in the GUI, DACP 64 may determine whether a user has moved a direction handle, as indicated at block 220. If a direction handle has been moved, DACP 64 may reconfigure the I/O devices according to the new setting, as shown at block 222. As indicated at block 224, DACP 64 may then update the GUI to reflect the new settings.

For example, a user presented with the GUI of FIG. 2 could drag right direction handle 112 from directly under the fourth gain indicator item to directly under the fifth gain indicator item, and the user could drag left direction handle 110 from directly under the second gain indicator item to directly under the third gain indicator item. The user might want to do so, for example, if the user were using processing system 20 in a video conference or teleconference, and the user were seated slightly to the right of processing system 20. In response to detecting that the user has moved the handles in this manner, DACP 64 may (a) disable the second microphone, (b) set the third and fifth microphones to an intermediate gain level, and (c) set the fourth microphone to maximum gain. DACP 64 may then modify the GUI to look like FIG. 3.

If a person were then to sit down on the left side of the user and ask to share processing system 20 for the conference, the user might then shift the focus of the microphone array more towards the left. The result might be like that depicted in FIG. 4, which shows that the direction handles have been moved, the second and third microphones have been set at or near maximum gain, and the first and fourth microphones have been set to intermediate gain.

Figure 3:
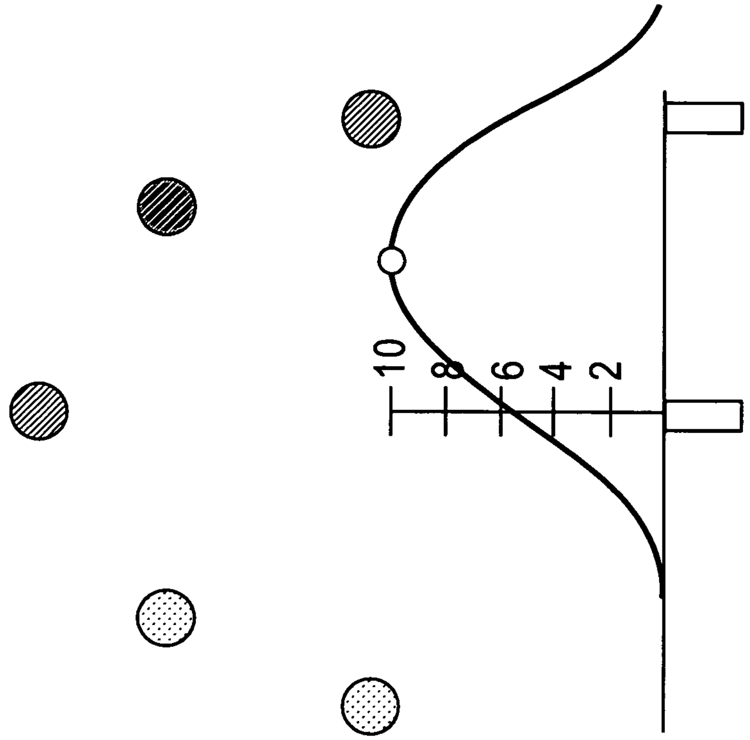
FIGS. 2-6 are schematic diagrams illustrating various arrangements of objects in a user interface for controlling an array of I/O devices, according to an example embodiment of the present invention.
Figure 4:
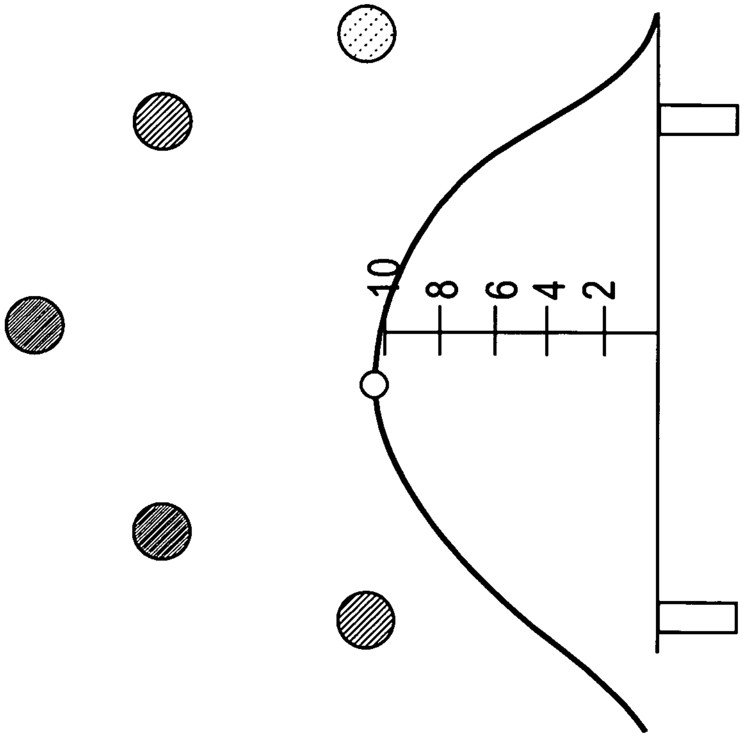

In the example embodiment, the shape of the gain indicator line, and the corresponding gain settings for the devices in the array, may change, depending on whether the gain handles are (a) positioned directly under gain indicator items or (b) positioned in the spaces between gain indicator items. For instance, as shown in FIGS. 2-4, the gain level may taper off gradually when the direction handles are directly under gain indicator items. However, as shown in FIGS. 5 and 6, when a direction handle lies in the space between gain indicator items, the gain level may be sharply or completely attenuated for any devices outside of the direction handles, and a uniform gain setting may be used for all devices within the direction handles.

Referring again to FIG. 7, after responding to movement of the direction handles, or determining that the direction handles have not been moved, DACP 64 may determine whether gain handle 120 has been moved. If gain handle 120 has been moved, DACP 64 may reconfigure the I/O devices according to the new setting, as shown at block 232. As indicated at block 234, DACP 64 may then update the GUI to reflect the new settings.

Figure 5:
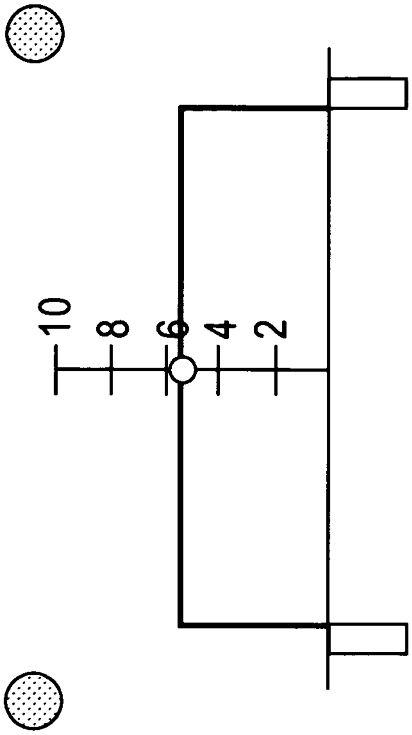
Figure 6:
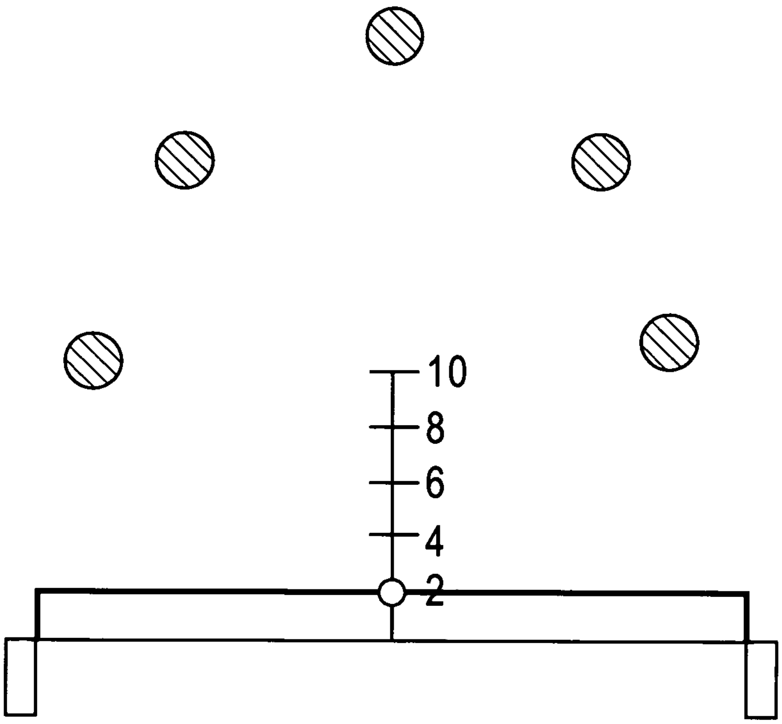

For example, a user presented with the GUI of FIG. 5 might desire to broaden the focus of the microphone array, while also reducing the gain. Accordingly, the user could (a) drag left direction handle 110 to the left past the first gain indicator item, (b) drag right direction handle 112 to the right past the fifth gain indicator item, and (c) drag the gain handle down from a gain level of about 6 to a gain level of about 2. In response to detecting that the user has moved the handles in this manner, DACP 64 may set all five microphones 42 to a gain level of about 2. DACP 64 may then modify the GUI to look like FIG. 6.

Referring again to FIG. 7, after responding to movement of gain handle 120, or determining that gain handle 120 has not been moved, DACP 64 may determine whether the user has instructed DACP 64 to exit. If so, the process may end. Otherwise, the process may return to block 220, with DACP 64 accepting user input, modifying the configuration of the device array, and updating the GUI, as described above.

The GUI presented by DACP 64 may thus combine output information concerning the status of the device array with input capabilities for controlling the device array. The GUI also does not require the user to understand the technology used by the I/O devices in the array, and the GUI is efficient in terms of user-interaction effort and space required (e.g., no menus or additional windows are required).

In one embodiment, the GUI includes control points or handles which allow direct manipulation of gain and directional focus for audio microphones deployed in an array. Other embodiments may be used for other technologies that can benefit from directional tuning. Such technologies may include, for instance, WiMAX or WiFi with multiple-input/multiple output (MiMo) capabilities (either broadcast or receive direction, if variable), RFID receivers, etc. The appearance of the indicators on the screen conveys both gain (e.g., strength or sensitivity) and directional focus at once.

For purposes of this disclosure, the term "gain" refers to the sensitivity setting of a microphone or antenna, as well as to the transmission power of an antenna, and to any similar power or sensitivity setting. Also, the terms "input/output device" and "I/O device" refer to devices that receive input, devices that produce output, and devices that receive input and produce output.

In various embodiments, the user may change the settings of the device array by direct manipulation of the interface using a keyboard or a pointing device (e.g., a mouse, touchpad, or "eraser-head" button). Similarly, a user interface according to the present invention may be manipulated with a touch screen, with the user placing a finger and/or stylus over the control points in order to move them. Alternatively, each control point may be given a different label, and verbal commands may be used to set the arrays. Any other suitable input device or devices may be used to interact with the user interface in other embodiments.

In light of the principles and example embodiments described and illustrated herein, it will be recognized that the described embodiments can be modified in arrangement and detail without departing from such principles. Also, although the foregoing discussion has focused on particular embodiments, other configurations are contemplated as well. Even though expressions such as "in one embodiment," "in another embodiment," or the like may be used herein, these phrases are meant to generally reference embodiment possibilities, and are not intended to limit the invention to particular embodiment configurations. As used herein, these terms may reference the same or different embodiments that are combinable into other embodiments.

Similarly, although example processes have been described with regard to particular operations performed in a particular sequence, numerous modifications could be applied to those processes to derive numerous alternative embodiments of the present invention. For example, alternative embodiments may include processes that use fewer than all of the disclosed operations, processes that use additional operations, processes that use the same operations in a different sequence, and processes in which the individual operations disclosed herein are combined, subdivided, or otherwise altered.

Alternative embodiments of the invention also include machine-accessible media containing instructions for performing the operations of the invention. Such embodiments may also be referred to as program products. Such machine-accessible media may include, without limitation, storage media such as floppy disks, hard disks, CD-ROMs, ROM, and RAM, and other detectable arrangements of particles manufactured or formed by a machine or device. Instructions may also be used in a distributed environment, and may be stored locally and/or remotely for access by single or multi-processor machines.

It should also be understood that the hardware and software components depicted herein represent functional elements that are reasonably self-contained so that each can be designed, constructed, or updated substantially independently of the others. In alternative embodiments, many of the components may be implemented as hardware, software, or combinations of hardware and software for providing functionality such as that described and illustrated herein. The hardware, software, or combinations of hardware and software for performing the operations of the invention may also be referred to as logic or control logic.

In view of the wide variety of useful permutations that may be readily derived from the example embodiments described herein, this detailed description is intended to be illustrative only, and should not be taken as limiting the scope of the invention. What is claimed as the invention, therefore, is all implementations that come within the scope and spirit of the following claims and all equivalents to such implementations.

What is claimed is:

1. A method for controlling an array of input/output devices, the method comprising:

displaying an array of objects in a user interface, the displayed array of objects representing an array of input/output (I/O) devices for a processing system;

displaying a gain indicator line in the user interface near the array of objects, the gain indicator line having a shape that reflects current gain settings for two or more of the I/O devices in the array of I/O devices, wherein the gain indicator line provides an array of gain indicator items reflecting a spectrum of gain levels including gain levels indicating one or more of sensitivity settings or transmission power settings relating to the array I/O devices;

displaying a set of controls substantially below the array of objects in the user interface, wherein the controls comprise a right handle, a left handle, and a gain handle, wherein the left handle and the right handle can be moved by a user to control which I/O devices in the array of I/O devices will be used, and wherein the gain handle can be moved by the user to control gain for at least one of the I/O devices; and modifying the gain of at least one of the I/O devices in the array, in response to manipulation of one or more of the controls by the user.

2. A method according to claim 1, further comprising:

displaying each of the objects in the array of objects with an attribute that reflects a current gain setting of a corresponding I/O device in the array of I/O devices.

3. A method according to claim 1, wherein the operation of displaying a gain indicator line in the user interface comprises displaying the gain handle on the gain indicator line.

4. A method according to claim 1, wherein the operation of displaying a gain indicator line in the user interface comprises: displaying the gain handle on the gain indicator line; and displaying the gain indicator line at a position that correlates to a current setting, relative to a range of possible settings for the array of objects; and providing the gain handle with a range of motion that corresponds to the range of possible settings for the array of objects.

5. The method of claim 1, wherein the spectrum of gain levels further comprise a color-coded levels or numbered levels to provide scaled information with regard to continuum of values or relative levels of gain relating to one or more in-use elements of one or more of the array of I/O devices.

6. An apparatus, comprising:

a device array controller to present a user interface for controlling an array of input/output (I/O) devices, the user interface to comprise:

a processor; and an array of objects representing the array of I/O devices, wherein a gain indicator line in the user interface is displayed near the array of objects, the gain indicator line having a shape that reflects current gain settings for two or more of the I/O devices in the array of I/O devices, wherein the gain indicator line provides an array of gain indicator items reflecting a spectrum of gain levels including gain levels indicating one or more of sensitivity settings or transmission power settings relating to the array I/O devices; and a set of controls displayed near the array of objects in the user interface, wherein the controls comprise a right handle, a left handle, and a gain handle, wherein the left handle and the right handle can be moved by a user to control which I/O devices in the array of I/O devices will be used, and wherein the gain handle can be moved by the user to control gain for at least one of the I/O devices, wherein the gain of at least one of the I/O devices in the array is modified in response to manipulation of one or more of the controls by the user.

7. An apparatus according to claim 6, wherein the device array controller comprises control logic to modify the gain of at least one of the I/O devices in the array, in response to manipulation of one or more of the controls by the user.

8. An apparatus according to claim 6, further comprising:

the device array controller to display each of the objects in the array of objects with an attribute that reflects a current gain setting of a corresponding I/O device in the array of I/O devices.

9. An apparatus according to claim 6, further comprising:

the device array controller to display a gain indicator line in the user interface near the array of objects, the gain indicator line having a shape that reflects current gain settings for two or more of the I/O devices in the array of I/O devices, wherein the device array controller is further to display the gain handle on the gain indicator line.

10. The apparatus of claim 6, wherein the spectrum of gain levels further comprise a color-coded levels or numbered levels to provide scaled information with regard to continuum of values or relative levels of gain relating to one or more in-use elements of one or more of the array of I/O devices.

11. An article of manufacture, comprising:

a non-transitory machine-accessible medium; and instructions in the machine-accessible medium, wherein the instructions, when executed in a processing system, cause the processing system to perform operations comprising:

displaying an array of objects in a user interface, the displayed array of objects representing an array of input/output (I/O) devices, wherein the gain indicator line provides an array of gain indicator items reflecting a spectrum of gain levels including gain levels indicating one or more of sensitivity settings or transmission power settings relating to the array I/O devices;

displaying a set of controls near the array of objects in the user interface, wherein the controls comprise a right handle, a left handle, and a gain handle, wherein the left handle and the right handle can be moved by a user to control which I/O devices in the array of I/O devices will be used, and wherein the gain handle can be moved by the user to control gain for at least one of the I/O devices; and modifying the gain of at least one of the I/O devices in the array, in response to manipulation of one or more of the controls by the user.

12. An article of manufacture according to claim 11, wherein the instructions, when executed, cause the processing system to display each of the objects in the array of objects with an attribute that reflects a current gain setting of a corresponding I/O device in the array of I/O devices.

13. An article of manufacture according to claim 11, wherein the instructions, when executed, cause the processing system to display a gain indicator line in the user interface near the array of objects, the gain indicator line having a shape that reflects current gain settings for two or more of the I/O devices in the array of I/O devices.

14. The article of manufacture of claim 11, wherein the spectrum of gain levels further comprise a color-coded levels or numbered levels to provide scaled information with regard to continuum of values or relative levels of gain relating to one or more in use elements of one or more of the array of I/O devices.

15. A processing system, comprising:

a processing unit;

an array of input/output (I/O) devices in communication with the processing unit;

a display in communication with the processing unit; and a device array control program to execute on the processing unit, the device array control program to perform operations comprising:

displaying an array of objects in a user interface in the display, the displayed array of objects representing the array of I/O devices, wherein the gain indicator line provides an array of gain indicator items reflecting a spectrum of gain levels including gain levels indicating one or more of sensitivity settings or transmission power settings relating to the array I/O devices;

displaying a set of controls near the array of objects in the user interface, wherein the controls comprise a right handle, a left handle, and a gain handle, wherein the left handle and the right handle can be moved by a user to control which I/O devices in the array of I/O devices will be used, and wherein the gain handle can be moved by the user to control gain for at least one of the I/O devices; and modifying the gain of at least one of the I/O devices in the array, in response to manipulation of one or more of the controls by the user.

16. A processing system according to claim 15, wherein the array of I/O devices comprises an array of microphones or an array of antennas.

17. A processing system according to claim 15, further comprising:

the device array control program to display each of the objects in the array of objects with an attribute that reflects a current gain setting of a corresponding I/O device in the array of I/O devices.

18. A processing system according to claim 15, further comprising:

the device array control program to display a gain indicator line in the user interface near the array of objects, the gain indicator line having a shape that reflects current gain settings for two or more of the I/O devices in the array of I/O devices.

19. The processing system of claim 15, wherein the spectrum of gain levels further comprise a color-coded levels or numbered levels to provide scaled information with regard to continuum of values or relative levels of gain relating to one or more in use elements of one or more of the array of I/O devices.

* * * * *